United States Patent [19]
Gerst et al.

[11] Patent Number: 5,665,921
[45] Date of Patent: Sep. 9, 1997

[54] GAS TIGHT PRESSURE SENSOR SEALED WITH FLEXIBLE METALLIC ADAPTOR AND HAVING CERAMIC SENSOR ELEMENT

[75] Inventors: Peter Gerst, Weil am Rhein; Karlheinz Banholzer, Hausen; Winfried Maier, Maulburg, all of Germany

[73] Assignee: Endress & Hauser GmbH & Co., Maulburg, Germany

[21] Appl. No.: 610,361

[22] Filed: Mar. 4, 1996

[30] Foreign Application Priority Data

Mar. 31, 1995 [EP] European Pat. Off. ........... 95104780

[51] Int. Cl.⁶ .................. G01L 7/08; G01L 9/00
[52] U.S. Cl. .................. 73/715; 73/724; 73/723
[58] Field of Search ................ 73/756, 717, 718, 73/720, 721, 723, 724, 726, 727

[56] References Cited

U.S. PATENT DOCUMENTS

| 4,888,662 | 12/1989 | Bishop | 73/724 X |
|---|---|---|---|
| 4,898,035 | 2/1990 | Yajima et al. | |
| 5,063,784 | 11/1991 | Ridenour | 73/756 |
| 5,134,887 | 8/1992 | Bell | |
| 5,174,157 | 12/1992 | Obermeier et al. | |
| 5,535,629 | 7/1996 | Gerdes et al. | 73/756 |

FOREIGN PATENT DOCUMENTS

| 0 372 988 A3 | 6/1990 | European Pat. Off. |
| 0 461 459 B1 | 12/1991 | European Pat. Off. |
| 0 607 482 A1 | 7/1994 | European Pat. Off. |
| 42 34 290 A1 | 4/1994 | Germany |
| 1182729 | 7/1989 | Japan |

*Primary Examiner*—Richard Chilcot
*Assistant Examiner*—Joseph L. Felber
*Attorney, Agent, or Firm*—Bose McKinney & Evans

[57] ABSTRACT

Provision is made for a pressure sensor with a ceramic sensor element (1) which is introduced in a gas-tight manner, having a metallic housing (2) and having a metallic adapter (3) which is arranged between the sensor element (1) and housing (2) and which is connected in a gas-tight manner both to the housing (2) and to the sensor element (1).

6 Claims, 4 Drawing Sheets

GAS TIGHT PRESSURE SENSOR SEALED WITH FLEXIBLE METALLIC ADAPTOR AND HAVING CERAMIC SENSOR ELEMENT

TECHNICAL FIELD OF THE INVENTION

The invention relates to a pressure sensor having a ceramic sensor element and having a metallic housing in which the sensor element is clamped in a gas-tight manner.

BACKGROUND OF THE INVENTION

In DE-A 42 34 290, a description is given of a pressure sensor having a rotationally symmetrical ceramic sensor element, having a rotationally symmetrical housing exhibiting an axial bore, the diameter of which decreases in the direction of the front side, which faces the measuring medium, and having a single sealing element which is introduced between the housing and the outer surface of the pressure sensor such that it is flush with the front thereof and consists of an organic material.

A disadvantage of such a pressure sensor is that a sealing element of this type is necessary in order to fix the ceramic sensor element in the housing in a pressure-tight and stress-free manner. However, these seals are not fully gas-tight. This is because gas molecules pass by diffusion through the seal into the interior of the housing. Moreover, the corrosion-resistance of said seals is, by far, not as good as that of the ceramic sensor element.

This basic problem is not remedied in any way by high-outlay designs, as are described, for example, in EP-B 461 459. The latter specifies a pressure sensor having a ceramic sensor, that surface of the ceramic sensor against which the sealing element rests being provided with a glass layer in order to improve the sealing. Although the contact surface between the glass layer and seal is much more impermeable than between the ceramic and seal, since glass has a smoother surface than ceramic, the gas diffusion through the seal is not reduced in any way.

The safety regulations in a large number of countries require gas-tight separation of measuring medium and electronics if the pressure sensors are to be used in potentially explosive areas, e.g. with flammable gases or liquids. At present, in order to achieve this, contact pins are glazed in over a specific length or use is made of similar high-outlay lead-throughs for electric lines.

Clamping in of the sensor may also be rendered gas-tight in other ways. Diaphragm seals, such as those described, for example, in EP-A 607 482, may be provided upstream of the sensor element. On the side which faces the measuring medium, such diaphragm seals exhibit a diaphragm usually consisting of a thin corrosion-resistant metal.

Furthermore, the metal diaphragm is very thin and thus sensitive. Abrasive measuring media easily produce plastic deformation of the diaphragm and thus measuring errors.

The object of the invention is thus to specify a pressure sensor having a ceramic sensor element and a metallic housing, into which pressure sensor the sensor element is installed in a gas-tight manner.

SUMMARY OF THE INVENTION

In order to achieve this object, the invention thus comprises a pressure sensor having a ceramic sensor element, having a metallic housing and having a metallic adapter which is arranged between the sensor element and housing and which is connected in a gas-tight manner both to the housing and to the sensor element.

According to one configuration of the invention, the housing exhibits a central axial bore through which an active surface of the sensor element is in contact with a measuring medium, the pressure of which is to be measured.

According to a further configuration of the invention, a sealing element is located between the adapter and the measuring medium.

According to an advantageous configuration of the invention, the adapter is designed as a tube piece into which the sensor element is at least partially introduced. It is, in particular, possible for the sensor element to be introduced into the tube piece such that it is flush with the front of said tube piece.

According to a further advantageous configuration of the invention, a flange which bears on an annular surface of the housing is integrally formed on the adapter designed as a tube.

According to a further advantageous configuration of the invention, the adapter is designed as an annular disc, of which an outer border region bears on an annular surface of the housing and an inner border region bears on a surface of the sensor element which is remote from an active surface.

According to a further advantageous configuration, the adapter is designed as an annular disc, of which an outer border region bears on an annular surface of the housing and an inner border region bears on an outer insensitive annular surface of an active surface of the sensor element.

According to a further advantageous configuration of the invention, the adapter is designed as a diaphragm, and the sensor element is fixed by means of a sensor fastening which is located on that side of the sensor element in the housing which is remote from the measuring medium.

According to an advantageous configuration, said diaphragm is designed as an annular disc, of which an outer border region bears on a shoulder of the housing and an inner border region bears on a surface of the sensor element which is remote from an active surface.

According to a further advantageous configuration, the diaphragm is designed as a tube piece, into one end of which the sensor element is introduced.

Advantages of the invention consist, inter alia, in the fact that the sensor element is connected in a gas-tight manner to the housing by the adapter, that the proposed method for clamping in the sensor element is stress-free, that the corrosion-resistance and the mechanical strength of the active sensor surface can be fully utilized since the fastening of the sensor element and the adapter are equally sturdy and corrosion-resistant, that such a pressure sensor can be used in potentially explosive areas, and that the pressure sensor, with the sensor element installed such that it is flush with the front thereof, can be cleaned particularly well and is thus very well suited for applications in the food industry.

BRIEF DESCRIPTION OF THE DRAWINGS

The invention will now be explained in more detail with reference to FIGS. 1 to 7 of the drawing; the same elements are provided with the same reference numerals in the drawings.

DETAILED DESCRIPTION OF THE INVENTION

Figure 1:
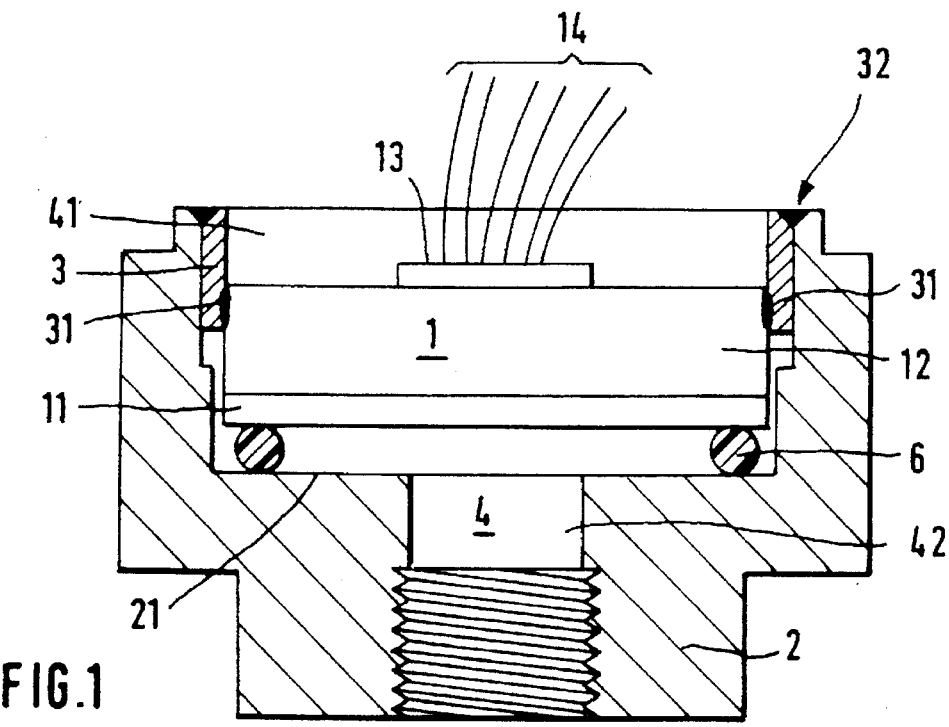
FIG. 1 shows a longitudinal section of a first variant of the pressure sensor, having an adapter which is designed as a tube piece.

In FIGS. 1 to 7, it is common to all the pressure sensors that they exhibit a rotationally symmetrical sensor element 1 which is fastened in a gas-tight manner in a housing 2, which is likewise rotationally symmetrical, by means of an adapter 3.

The sensor element 1 is, for example, a capacitive cylindrical pressure-measuring cell which comprises a diaphragm 11 and a basic body 12, which are kept at a defined distance from one another and are connected to one another in a hermetically sealed manner by a connecting material, e.g. an active brazing solder. The inner surfaces, coated with electrode material, of the diaphragm 11 and of the basic body 12 form at least one measuring capacitor, the capacitance of which depends on the bending of the diaphragm 11 and is thus a measure of the pressure applied to the diaphragm 11.

The diaphragm 11 may consist of ceramic, oxide ceramic, quartz, sapphire or a crystalline material. The basic body 12 preferably consists of a material which is very similar to the material of the diaphragm 11 or at least exhibits a comparable thermal expansion coefficient.

On the side which is remote from the measuring medium, the sensor element 1 exhibits an electronic circuit 13 which converts the changes in capacitance of the measuring capacitor into a pressure-dependent electric signal and makes the latter accessible, via electric connection lines 14, for further processing and/or display.

It is, of course, possible to use a differential-pressure-measuring cell instead of a pressure-measuring cell. Such a differential-pressure cell is, for example, a measuring cell of the abovedescribed type which additionally exhibits a pressure feedline, which has the task of passing through the basic body into the interior of the measuring cell a pressure applied to one end of it.

The housing 2 exhibits a central bore 4 passing through it in each case. The adapter 3 forms an elastic connecting element between the sensor element 1 and the housing 2. This ensures that the fastening of the sensor element 1 is stress-free.

The adapter 3 consists of a measuring-medium-resistant material which exhibits a comparable temperature coefficient to the material of the sensor element. Depending on the measuring medium, the material of the adapter is, for example, nickel, ferronickel, tantalum or stainless steel. It is also possible to select a material which does not have an extremely high corrosion-resistance, and to coat those surfaces of the adapter 3 which are in contact with the measuring medium with a material which has a higher corrosion-resistance, e.g. to nickel-plate or to gold-plate ferronickel.

The gas-tight connection between the sensor element 1 and the adapter 3 is a gas-tight joint 31 in each case. An example of such a gas-tight joint 31 between ceramic and metal is a connection by active brazing solder. Active brazing solder consists of a solder material to which at least one reactive element, e.g. titanium or zirconium, has been added by alloying. The reactive element wets the surface of the parts for soldering during the soldering operation. In the case of oxide ceramic, the high affinity of the reactive element with respect to oxygen gives rise to a reaction with the ceramic, which results in the formation of mixed oxides and free chemical valences.

The housing 2 and adapter 3 are joined to one another in a gas-tight manner by a connection 32, which is merely schematically illustrated in the figures. Said connection 32 is, for example, a conventional weld connection.

A longitudinal section through a first exemplary embodiment is shown in FIG. 1. Here, the diaphragm 11 of the sensor element 1 is in connection, through the central axial bore 4, with a measuring medium, the pressure of which is to be measured. The bore 4 exhibits two sections 41, 42, of which one section 41 is located on the side remote from the measuring medium and exhibits a diameter which is greater than the diameter of the sensor element 1, and of which the other section 42 is located on the side facing the measuring medium and exhibits a diameter which is smaller than the diameter of the sensor element 1.

At the location at which the diameter changes its value, the housing 2 exhibits an annular stepped surface 21. A sealing element 6 bears on an outer annular surface of the stepped surface 21. Depending on the measuring medium, said sealing element is, for example, a Viton O-ring, a Kalrez seal or a Viton seal sheathed in polytetrafluoroethylene. The sensor element 1 is inserted into the bore 4 from the side which is remote from the measuring medium and bears on the sealing element 6. The adapter 3 is designed as a tube piece into which the sensor element 1 is partially introduced.

The contact surfaces of the sensor element 1 and adapter 3, that is to say part of an inner continuous surface of the tube piece and part of an outer cylindrical surface of the sensor element 1 on the side which is remote from the measuring medium, are connected by the gas-tight joint 31. In the longitudinal section, the joint 31 is of a length which is sufficient in order to fix the sensor element in applications within a fixed pressure range. In the case of an active brazing solder connection, a solder length of a few millimeters is sufficient in order to ensure the gas-tightness.

The adapter 3 is introduced into the bore 4 of the housing 2. The section 41 of the housing 2 exhibits a region of greater cross section in order to receive the adapter 3 on the side which is remote from the measuring medium. The adapter 3 terminates flush with the housing 2 on the side which is remote from the measuring medium. The connection 32 between the housing 2 and the adapter 3 is only schematically illustrated. For a weld connection 32, this connection 32 likewise has a length of a few millimeters in longitudinal section, to ensure the gas-tightness.

In the case of a weld connection, it is necessary to design the housing 2 to be thin-walled in the region of the connection 32 since it is only possible to weld parts of approximately the same thickness. For this reason, the housing 2 exhibits a smaller external diameter in this region.

Figure 2:
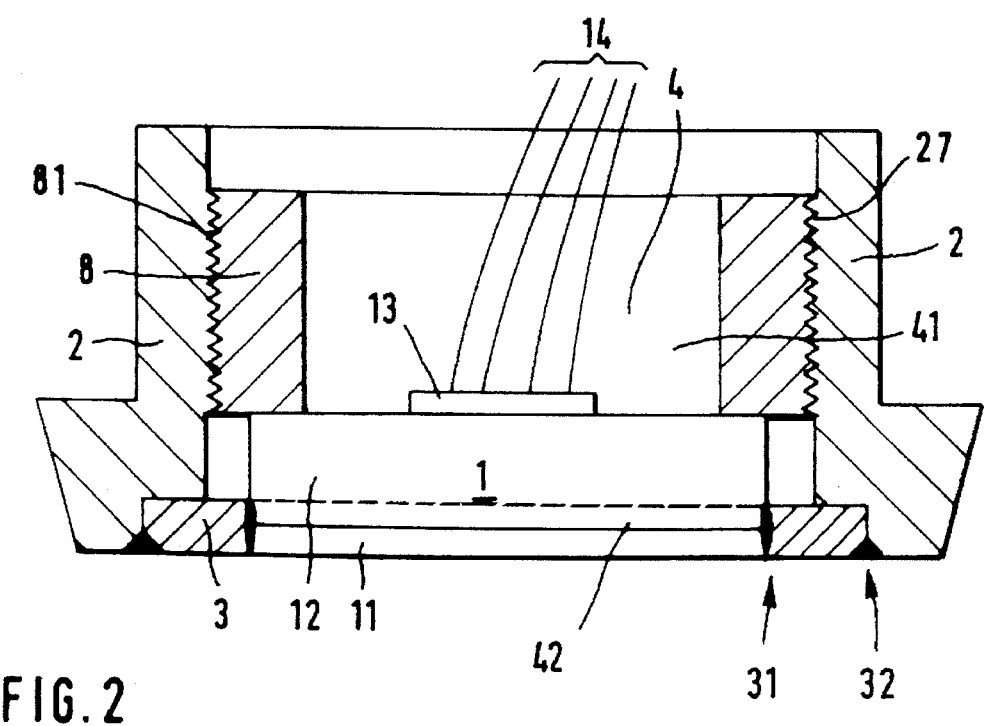
FIG. 2 shows a longitudinal section of a second variant of the pressure sensor, having an adapter which is designed as a tube piece into which the sensor element is introduced such that it is flush with the front of said tube piece.

The adapter 3 is likewise designed as a tube piece in FIG. 2. However, in contrast to FIG. 1, the sensor element 1 here is introduced into the adapter 3, on the side which faces the measuring medium, such that it is flush with the front of said adapter. For this purpose, the bore 4 likewise exhibits two sections 41, 42, the section 42 which faces the measuring medium exhibiting a greater cross section. The adapter 3 is inserted into said section 42 such that it is flush with the front thereof.

On the side which is remote from the measuring medium, a sensor fastening 8 is introduced into the housing 2. Said sensor fastening 8 is a screw-in piece which exhibits an external thread 81. Said screw-in piece is screwed, by means of an internal thread 27 located in the housing 2, on the side which is remote from the measuring medium, against an outer annular surface, which is remote from the measuring medium, of the sensor element 1.

The flush-front design described is particularly suitable for use in the food industry since such a pressure sensor can easily be cleaned and does not exhibit any organic sealing elements, which, in the food industry, constitute a potential breeding ground for bacteria.

Figure 3:
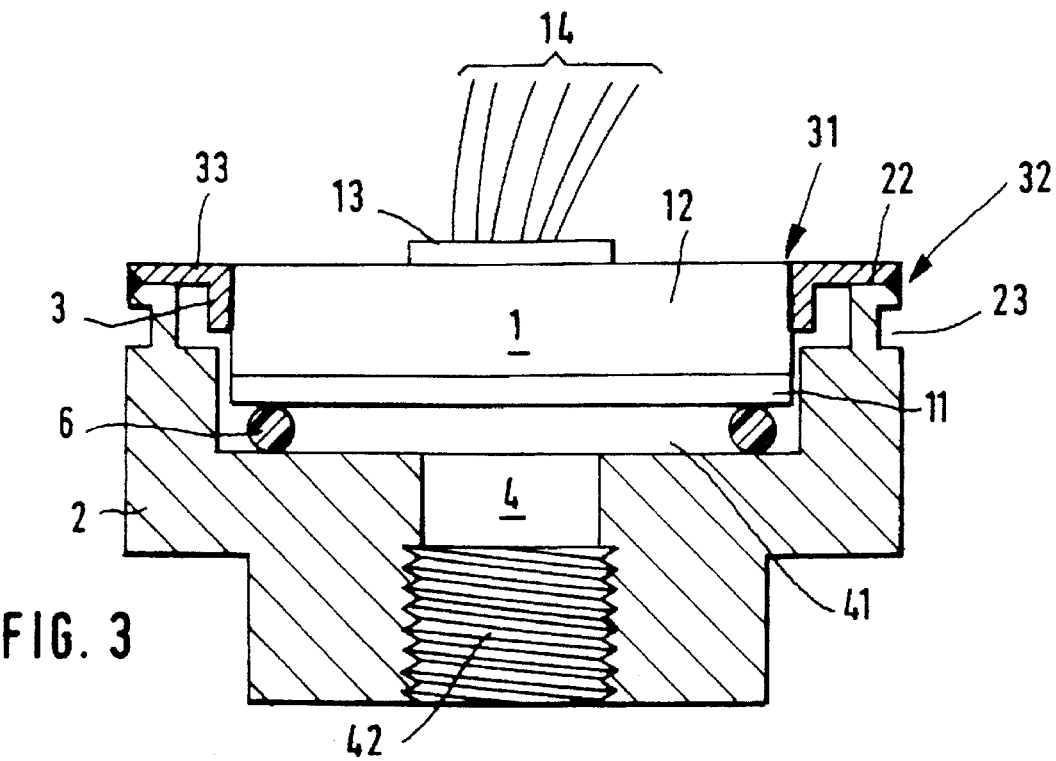
FIG. 3 shows a longitudinal section of a third variant of the pressure sensor, having an adapter which is designed as a tube piece with a flange integrally formed on it.

An exemplary embodiment which largely corresponds to that of FIG. 1 is represented in FIG. 3. Therefore, it is only the differences with respect to FIG. 1 which are described here. The main difference consists in the fact that the adapter 3 is designed as a tube piece on which a flange 33 is integrally formed.

The sensor element 1 is partially introduced into the tubular adapter 3. The tube piece with the flange 33 integrally formed on it terminates flush with the surface of the sensor element 1 which is remote from the measuring medium.

The contact surfaces of the sensor element 1 and adapter 3, that is to say part of an inner continuous surface of the adapter 3 and part of an outer cylindrical surface of the sensor element 1, are connected to one another by the gas-tight joint 31. The section 41, which is remote from the measuring medium, of the bore 4 exhibits, in this case, two regions with different cross sections. The region with the smaller cross section is located on that side of the section 41 of the bore 4 which faces the measuring medium.

The adapter 3 is introduced into the bore 4 of the housing 2 and bears, by means of the flange 33 integrally formed on it, on an annular surface 22, which is formed by the termination of the housing 2 on the side which is remote from the measuring medium. The housing 2 and flange 33 are welded to one another or are connected to one another in a gas-tight manner by some other means. Said connection 32 is shown schematically. In the case of a weld connection, it is necessary to design the housing 2 to be thin-walled in the region of the connection 32 since it is only possible to weld parts of approximately the same thickness. For this reason, the housing 2 exhibits on the outside, directly beneath the adapter fastening, a groove 23 which runs round in an annular manner and has a rectangular cross section.

Figure 4:
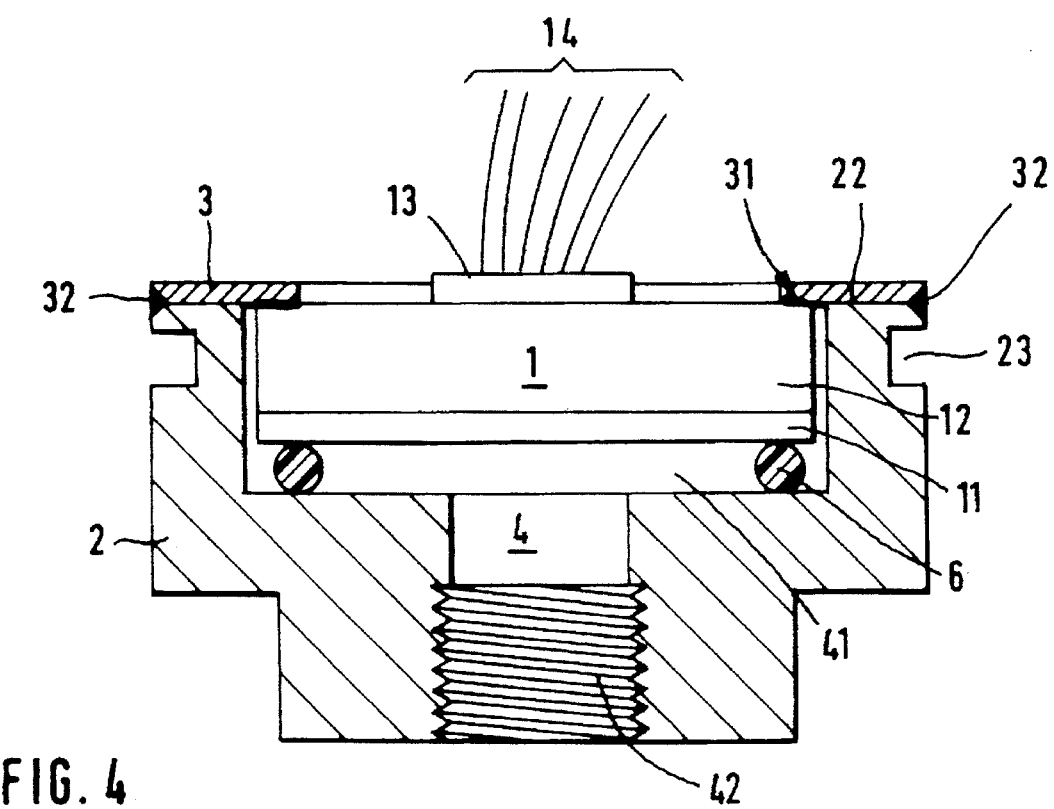
FIG. 4 shows a longitudinal section of a fourth variant of the pressure sensor, having an adapter which is designed as an annular disc.

A further variant, which likewise largely corresponds to that according to FIG. 1, is represented in FIG. 4. Likewise, it is only the differences from FIG. 1 which will be described.

The housing 2 terminates with an annular surface 22 on the side which is remote from the measuring medium. Said annular surface 22 is located, in longitudinal section, level with the surface of the sensor element 1 which is remote from the measuring medium.

In this exemplary embodiment, the adapter 3 is designed as an annular disc. The latter bears, by means of an outer border region, on the annular surface 22 of the housing 2 and, by means of an inner border region, on an outer annular surface of the surface of the sensor element 1 which is remote from the measuring medium. The contact surfaces of the sensor element 1 and adapter 3 are connected to one another by the gas-tight joint 31.

Analogously to FIG. 3, the housing exhibits on the outside, directly beneath the adapter fastening, a groove 23 which runs round in an annular manner and has a rectangular cross section.

Figure 5:
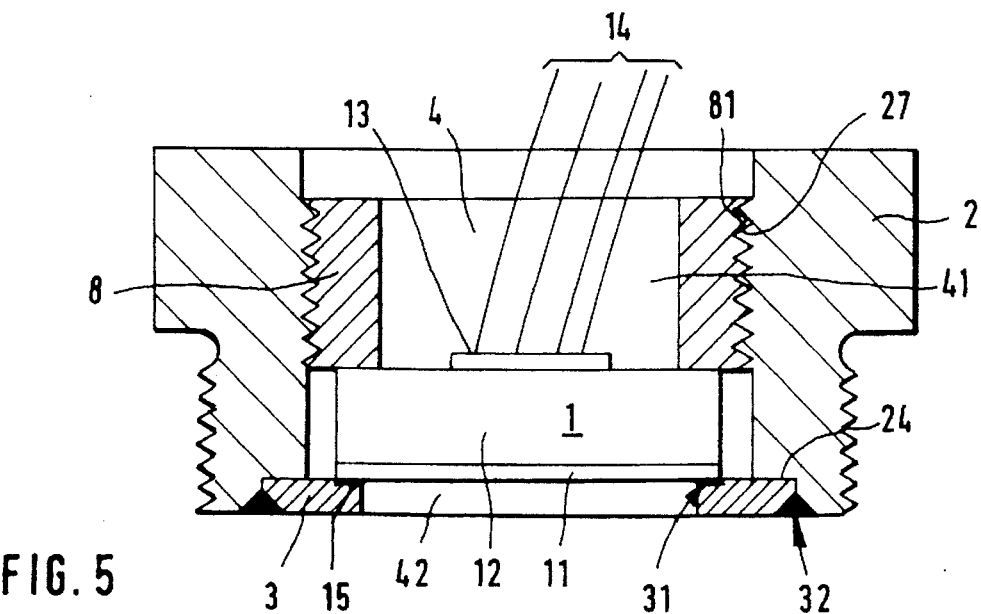
FIG. 5 shows a longitudinal section of a fifth variant of the pressure sensor, having an adapter which is designed as an annular disc.

An exemplary embodiment which likewise exhibits an annular disc as adapter 3 is represented in FIG. 5. The housing 2 is identical to the housing represented in FIG. 2. The adapter 3 is introduced into the section 42 of the bore 4 such that it is flush with the front thereof, and it rests against a stepped surface 24 of the housing. The adapter is connected to the housing 2 in a gas-tight manner by means of the connection 32.

The sensor element 1 is introduced into the housing 2 from the side remote from the measuring medium and bears, by means of an outer pressure-insensitive annular surface 15 of the active surface of the sensor element, on the adapter 3. The gas-tight connection 31 is present between the sensor element 1 and adapter 3.

There is a sensor fastening 8 which is identical to that represented in FIG. 2.

Figure 6:
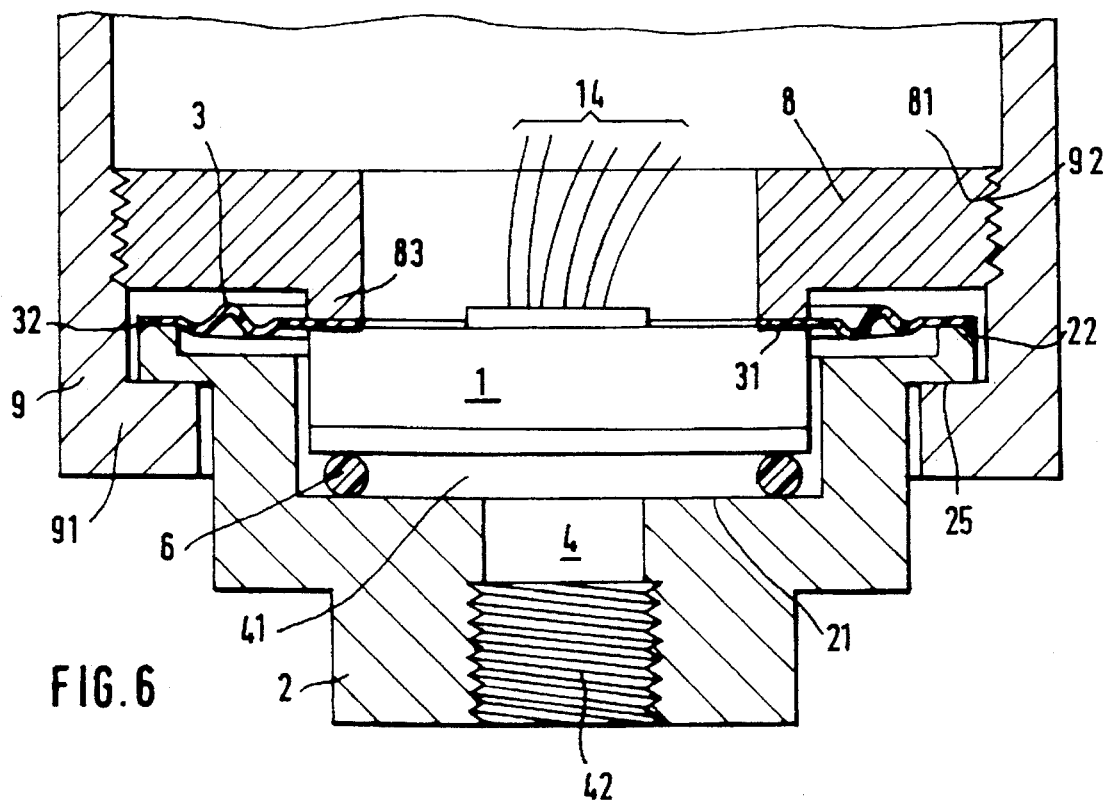
FIG. 6 shows a longitudinal section of a sixth variant of the pressure sensor, having an adapter which is designed as a diaphragm in the form of an annular disc.

In FIG. 6, the adapter 3 is designed as a diaphragm in the form of an annular disc. In FIG. 6, the section 41 of the bore 4 exhibits two regions with different cross sections. The region with the smaller cross section is located on the side which faces the measuring medium. The sensor element 1 is introduced in this region and bears on the seal 6, which, in turn, is supported on the stepped surface 21 of the housing 2.

The housing 2 terminates with an annular surface 22 on the side which is remote from the measuring medium, which annular surface is located, in longitudinal section, level with the surface of the sensor element 1 which is remote from the measuring medium.

The diaphragm-like adapter 3 bears, by means of an annular outer border surface, on the annular surface 22 and, by means of an annular inner border surface, on the surface of the sensor element 1 which is remote from the measuring medium.

In order that such a pressure sensor with a diaphragm as an adapter 3 is capable of functioning, it is necessary to fix the sensor element 1. For this purpose, use is made, according to FIG. 6, of an outer housing 9. The latter is a tube, at one end of which a securing ring 91 is integrally formed. The housing 2 is introduced into said outer housing 9 and bears on the securing ring 91 by means of an outer stepped annular surface 25.

The sensor element 1 is pressed, from the side which is remote from the measuring medium, against the seal 6 in the housing 2 by a sensor fastening 8. The sensor fastening 8 exhibits an external thread 81 and is screwed into an internal thread 92 located in the outer housing 9. The sensor fastening 8 is a ring, a tube piece 83 of smaller external diameter being integrally formed on at that end of said ring which faces the sensor element. Said tube piece 83 has the same cross-sectional surface area as the annular inner border surface of the adapter 3, the latter bearing, by means of said annular inner border surface, on the surface of the sensor element 1 which is remote from the measuring medium, and said tube piece 83 is screwed directly against said inner border surface of the adapter 3.

There is no need for a gas-tight connection between the housing 2 and the outer housing 9 since the outer housing 9 is not in contact with the measuring medium.

Figure 7:
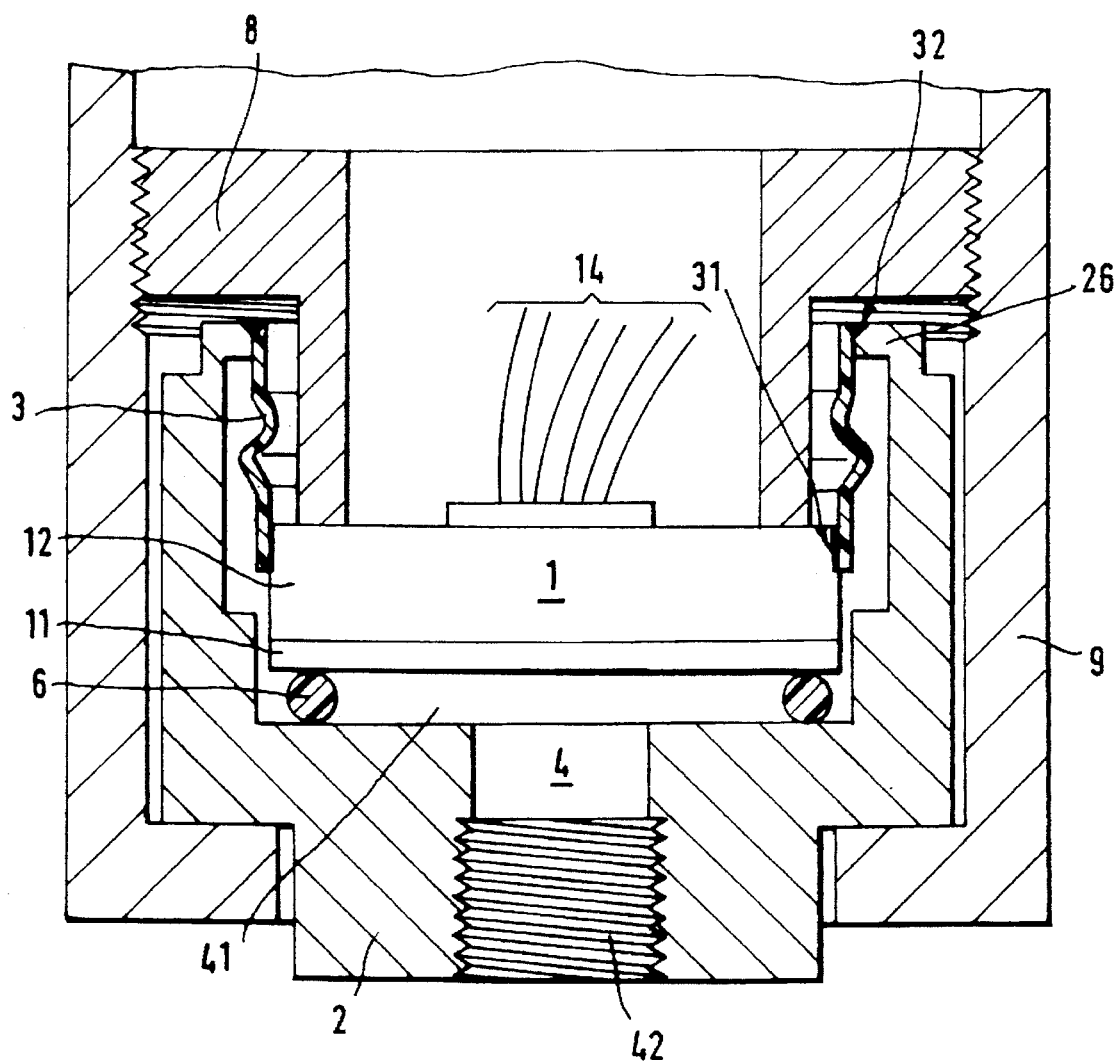
FIG. 7 shows a longitudinal section of a seventh variant of the pressure sensor, having an adapter which is designed as a tubular diaphragm.

Another variant which exhibits, as adapter 3, a diaphragm which is designed as a tube piece is represented in FIG. 7. The sensor element 1 is partially introduced into said tubular adapter 3.

The contact surfaces of the sensor element 1 and adapter 3, that is to say part of an inner continuous surface of the tubular diaphragm 3 and part of the outer cylindrical surface of the sensor element 1 on the side which is remote from the measuring medium, are connected to one another by the gas-tight joint 31.

In the region of the axially extending adapter 3, the section 41 of the bore 4 of the housing 2 exhibits an enlarged cross section for receiving the diaphragm 3. On the side which is remote from the measuring medium, the housing terminates with a ring 26 extending radially into its interior. The diaphragm 3 is introduced into the bore 4 of the housing 2 and is fastened on the ring 26.

In the region of the connection 32 between the housing 2 and adapter 3, the housing 2 is thin-walled in order that straining does not occur during a welding operation. The outer housing 9 and the sensor fastening 8 are identical to those in FIG. 6 and are therefore not described in any more detail here.

On account of the additional sensor fastening 8, the exemplary embodiments of FIGS. 2, 5, 6 and 7 can be used for considerably higher pressures, e.g. up to approximately 4 MPa (40 bar), than the exemplary embodiments represented in FIGS. 1, 3 and 4, which are designed for a pressure range of not more than approximately 1 MPa (10 bar).

The fastening of the housing 2 at the measuring location is not represented in the drawings. Said fastening takes place, for example, in that the housing 2 is designed as a flange which is screwed, at the measuring location, to a counter-flange, in that the housing 2 exhibits an external thread which is screwed into a corresponding opening, or in that the housing 2 is designed as a turned part which is welded into a container opening. Further releasable or non-releasable housing fastenings are known to the person skilled in the art.

We claim:

1. A pressure sensor comprising:
   a ceramic sensor element having an active surface for contacting the measuring medium,
   a metallic housing and
   a metallic adapter which is arranged between the sensor element and housing, the metallic adaptor being connected in a gas-tight manner both to the housing and to the sensor element, the metallic adapter being designed as a diaphragm, and the sensor element being fixed by means of a sensor fastening which is located on a surface of the sensor element in the housing which is not the active surface,
   wherein the diaphragm is designed to be annular, and have an outer border region that bears on an annular surface of the housing and an inner border region that bears on a surface of the sensor element which is not the active surface.

2. The pressure sensor as claimed in claim 1, wherein the housing includes a central axial bore through which an active surface of the sensor element is in contact with a measuring medium, the pressure of which is to be measured.

3. The pressure sensor as claimed in claim 1, wherein a sealing element is located between the adapter and the measuring medium.

4. The pressure sensor as claimed in claim 1, wherein the diaphragm is designed as an annular tube piece having one end fixed to the sensor element.

5. A pressure sensor comprising
   a ceramic sensor element,
   a metallic housing and
   a metallic adapter which is arranged between the sensor element and housing and which is connected in a gas-tight manner both to the housing and to the sensor element, the adapter being designed as a diaphragm, and the sensor element being fixed by means of a sensor fastening which is located on that side of the sensor element in the housing which is remote from the measuring medium.

6. A pressure sensor comprising:
   a ceramic sensor element,
   a metallic housing and
   a metallic adapter which is arranged between the sensor element and housing and which is connected in a gas-tight manner both to the housing and to the sensor element, the adapter being designed as a diaphragm, and the sensor element being fixed by means of a sensor fastening which is located on that side of the sensor element in the housing which is remote from the measuring medium,
   wherein the diaphragm is designed as an annular disc, of which an outer border region bears on an annular surface of the housing and an inner border region bears on a surface of the sensor element which is remote from an active surface.

* * * * *